(12) United States Patent
Yoakim et al.

(10) Patent No.: US 8,409,646 B2
(45) Date of Patent: Apr. 2, 2013

(54) SINGLE-USE CAPSULE FOR PREPARING A FOOD LIQUID BY CENTRIFUGATION

(75) Inventors: Alfred Yoakim, St. Legier la Chiesaz (CH); Jean-Paul Denisart, La Conversion (CH); Antoine Ryser, Lausanne (CH)

(73) Assignee: Nestec S.A., Vevey (CH)

( * ) Notice: Subject to any disclaimer, the term of this patent is extended or adjusted under 35 U.S.C. 154(b) by 400 days.

(21) Appl. No.: 12/602,568

(22) PCT Filed: May 23, 2008

(86) PCT No.: PCT/EP2008/056345
§ 371 (c)(1),
(2), (4) Date: Dec. 1, 2009

(87) PCT Pub. No.: WO2008/148650
PCT Pub. Date: Dec. 11, 2008

(65) Prior Publication Data
US 2010/0178392 A1    Jul. 15, 2010

(30) Foreign Application Priority Data

Jun. 5, 2007 (EP) .................................. 07109580
Feb. 29, 2008 (EP) .................................. 08102148

(51) Int. Cl.
B65D 81/32 (2006.01)
(52) U.S. Cl. ............ 426/115; 426/77; 99/295; 99/302 C; 99/323; 99/395
(58) Field of Classification Search ............... 426/77–84, 426/431–434, 115; 99/295, 302 C, 323, 99/395
See application file for complete search history.

(56) References Cited

U.S. PATENT DOCUMENTS

| | | | |
|---|---|---|---|
| 239,659 A | 4/1881 | Houston | |
| 1,963,476 A | 6/1934 | Smith | 210/67 |
| 2,778,739 A | 1/1957 | Rodth | 99/171 |
| 3,025,781 A | 3/1962 | Bossi | |
| 3,233,535 A | 2/1966 | Fowlie | |
| 3,566,770 A | 3/1971 | Crossley | 99/289 |

(Continued)

FOREIGN PATENT DOCUMENTS

| | | |
|---|---|---|
| AT | 197553 B | 5/1958 |
| BE | 894 031 | 2/1983 |

(Continued)

OTHER PUBLICATIONS

U.S. Appl. No. 12/856,369, filed Aug. 13, 2010.

(Continued)

*Primary Examiner* — Drew Becker
*Assistant Examiner* — Luana Z Long
(74) *Attorney, Agent, or Firm* — Winston & Strawn LLP

(57) ABSTRACT

A single-use capsule for preparing a food liquid from a food substance contained in the capsule by introducing water in the capsule and passing water through the substance using centrifugal forces for producing the food liquid which is centrifuged peripherally in the capsule relatively to a central axis (A) of the capsule. The capsule includes an enclosure containing a predetermined amount of food substance, and a plurality of outlet openings for enabling the food liquid to leave the enclosure under the centrifugal forces exerted in the capsule, with the outlet openings being arranged at a substantially peripheral portion of wall of the capsule.

20 Claims, 11 Drawing Sheets

U.S. PATENT DOCUMENTS

| | | | |
|---|---|---|---|
| 3,654,852 A | 4/1972 | Rosan, Sr. | |
| 3,812,773 A | 5/1974 | Hultsch | 99/290 |
| 3,822,013 A | 7/1974 | Van Der Veken | 206/233 |
| 3,967,546 A | 7/1976 | Cailliot | 99/286 |
| 3,985,069 A * | 10/1976 | Cavalluzzi | 99/295 |
| 4,426,919 A | 1/1984 | Rhoten | 99/289 |
| 4,464,982 A | 8/1984 | Leuschner et al. | 99/287 |
| 4,473,002 A | 9/1984 | Leuschner et al. | 99/302 |
| 4,545,296 A | 10/1985 | Ben-Shmuel | 99/289 P |
| 4,584,101 A | 4/1986 | Kataoka | 210/474 |
| 4,806,375 A | 2/1989 | Favre | 426/433 |
| 4,846,052 A | 7/1989 | Favre et al. | |
| 4,859,337 A | 8/1989 | Woltermann | 210/474 |
| 4,962,693 A | 10/1990 | Miwa et al. | 99/283 |
| 5,047,252 A * | 9/1991 | Liu et al. | 426/79 |
| 5,265,517 A | 11/1993 | Gilbert | 99/280 |
| 5,300,308 A | 4/1994 | Louridas | 426/112 |
| 5,325,765 A | 7/1994 | Sylvan et al. | 99/295 |
| 5,566,605 A | 10/1996 | Lebrun et al. | 99/302 |
| 5,637,335 A | 6/1997 | Fond et al. | 426/84 |
| 5,649,472 A | 7/1997 | Fond et al. | 99/295 |
| 5,755,149 A | 5/1998 | Blanc et al. | 99/289 |
| 5,773,067 A * | 6/1998 | Freychet et al. | 426/506 |
| 5,948,455 A | 9/1999 | Schaeffer et al. | 426/77 |
| 6,007,853 A | 12/1999 | Lesser | 426/77 |
| 6,607,762 B2 | 8/2003 | Lazaris et al. | 426/79 |
| 6,777,007 B2 | 8/2004 | Cai | 426/78 |
| 6,786,134 B2 | 9/2004 | Green | 99/289 P |
| 7,017,775 B2 | 3/2006 | Zettle et al. | 220/781 |
| 7,216,582 B2 | 5/2007 | Yoakim et al. | 99/295 |
| 7,469,627 B2 | 12/2008 | Li | 99/286 |
| 7,770,512 B2 | 8/2010 | Albrecht | 99/295 |
| 8,151,694 B2 | 4/2012 | Jacobs et al. | 99/302 R |
| 2003/0145736 A1 | 8/2003 | Green | 99/280 |
| 2005/0150390 A1* | 7/2005 | Schifferle | 99/295 |
| 2006/0110507 A1 | 5/2006 | Yoakim et al. | 426/433 |
| 2006/0236871 A1* | 10/2006 | Ternite et al. | 99/295 |
| 2007/0079708 A1 | 4/2007 | Li | 99/279 |
| 2008/0038414 A1* | 2/2008 | Veciana I Membrado et al. | 426/115 |
| 2009/0032454 A1 | 2/2009 | Rapparini | 201/337 |
| 2009/0136639 A1 | 5/2009 | Doglioni Majer | 426/431 |
| 2009/0155422 A1 | 6/2009 | Ozanne | 426/89 |
| 2010/0064899 A1 | 3/2010 | Aardenburg | 99/295 |
| 2010/0173056 A1 | 7/2010 | Yoakim et al. | 426/433 |
| 2010/0176004 A1 | 7/2010 | Schneider et al. | 205/687 |
| 2010/0178404 A1 | 7/2010 | Yoakim et al. | 426/431 |
| 2010/0186599 A1 | 7/2010 | Yoakim et al. | 99/295 |
| 2010/0203198 A1 | 8/2010 | Yoakim et al. | 426/80 |
| 2010/0203208 A1 | 8/2010 | Yoakim et al. | 426/431 |
| 2010/0239734 A1 | 9/2010 | Yoakim et al. | 99/295 |
| 2011/0041702 A1 | 2/2011 | Yoakim et al. | 99/302 R |
| 2011/0052761 A1 | 3/2011 | Yoakim et al. | 426/77 |
| 2011/0189362 A1 | 8/2011 | Denisart et al. | 426/433 |
| 2011/0217421 A1 | 9/2011 | Perentes et al. | 426/80 |
| 2011/0244099 A1 | 10/2011 | Perentes et al. | 426/431 |
| 2012/0058226 A1* | 3/2012 | Winkler et al. | 426/79 |

FOREIGN PATENT DOCUMENTS

| | | |
|---|---|---|
| DE | 2151920 A1 | 4/1973 |
| DE | 32 41 606 | 3/1984 |
| DE | 35 29 053 | 2/1987 |
| DE | 35 29 204 | 2/1987 |
| DE | 3529204 | 2/1987 |
| DE | 37 19 962 | 6/1988 |
| DE | 42 40 429 | 6/1994 |
| DE | 4439252 | 5/1996 |
| DE | 10355671 A1 | 6/2004 |
| DE | 10 2005 007 852 | 8/2006 |
| EP | 0242556 A1 | 10/1987 |
| EP | 0 250 810 A1 | 1/1988 |
| EP | 0 367 600 | 5/1990 |
| EP | 0 512 470 A1 | 11/1992 |
| EP | 0521187 | 1/1993 |
| EP | 0 607 759 | 7/1994 |
| EP | 0 651 963 | 5/1995 |
| EP | 0 749 713 | 12/1996 |
| EP | 0 806 373 B1 | 11/1997 |
| EP | 1208782 B1 | 5/2002 |
| EP | 1 299 022 B1 | 4/2003 |
| EP | 1 654 966 B1 | 5/2006 |
| EP | 1 774 878 | 4/2007 |
| EP | 1 813 333 A2 | 8/2007 |
| EP | 2 000 062 A1 | 12/2008 |
| EP | 2155021 B1 | 3/2011 |
| FR | 2 132 310 | 11/1972 |
| FR | 2 487 661 | 2/1982 |
| FR | 2 513 106 | 3/1983 |
| FR | 2 531 849 | 2/1984 |
| FR | 2 535 597 | 5/1984 |
| FR | 2 624 364 | 6/1989 |
| FR | 2 685 186 | 6/1993 |
| FR | 2 686 007 | 7/1993 |
| FR | 2 726 988 | 5/1996 |
| GB | 1 506 074 A | 4/1978 |
| GB | 2 416 480 | 4/1985 |
| GB | 2 227 405 A | 8/1990 |
| GB | 2 253 336 | 9/1992 |
| GB | 2 416 480 A | 2/2006 |
| JP | 50016225 A | 2/1975 |
| JP | 62254719 A | 11/1987 |
| JP | 63034581 U | 3/1988 |
| JP | 02124111 A2 | 5/1990 |
| JP | 02189114 A2 | 7/1990 |
| JP | 06339431 A2 | 12/1994 |
| JP | 3034606 | 2/1997 |
| JP | 2001061663 A | 3/2001 |
| JP | 2002189115 A | 7/2002 |
| JP | 2002215414 A | 8/2002 |
| JP | 2003144973 A2 | 5/2003 |
| JP | 2004517654 A | 6/2004 |
| JP | 2005516602 | 6/2005 |
| JP | 2005199071 A2 | 7/2005 |
| JP | 2005525146 A | 8/2005 |
| JP | 2006515764 A | 6/2006 |
| JP | 2006518226 A | 8/2006 |
| WO | WO 94/02059 A1 | 2/1994 |
| WO | WO 02/35977 A1 | 5/2002 |
| WO | WO2004/030500 A1 | 4/2004 |
| WO | WO2005/066040 A2 | 7/2005 |
| WO | WO 2006/082064 A1 | 8/2006 |
| WO | WO 2006/112691 | 10/2006 |
| WO | WO2007/014584 A1 | 2/2007 |
| WO | WO 2007/041954 | 4/2007 |
| WO | WO 2007/085921 A2 | 8/2007 |
| WO | WO 2007/110768 A2 | 10/2007 |
| WO | WO 2008/087099 A2 | 7/2008 |
| WO | WO 2008/148601 A1 | 12/2008 |
| WO | WO 2008/148604 | 12/2008 |
| WO | WO 2008/148646 | 12/2008 |
| WO | WO 2008/148656 | 12/2008 |
| WO | WO 2008/148834 | 12/2008 |
| WO | WO 2009/050540 A1 | 4/2009 |
| WO | WO 2009/106175 A1 | 9/2009 |
| WO | WO 2009/106598 A1 | 9/2009 |
| WO | WO 2009/133134 A1 | 11/2009 |
| WO | WO 2010/026045 A1 | 3/2010 |
| WO | WO 2010/026053 A1 | 3/2010 |
| WO | WO 2010/038213 A1 | 4/2010 |
| WO | WO 2010/041179 A2 | 4/2010 |

OTHER PUBLICATIONS

U.S. Appl. No. 12/860,705, filed Aug. 20, 2010.
International Search Report mailed Feb. 9, 2010 for Application No. PCT/EP2009/060697 filed Aug. 19, 2009.
International Search Report mailed Feb. 8, 2010 for Application No. PCT/EP2009/060771 filed Aug. 20, 2009.
U.S. Appl. No. 12/602,542, filed Dec. 1, 2009.
U.S. Appl. No. 12/602,553, filed Dec. 1, 2009.
U.S. Appl. No. 12/602,562, filed Dec. 1, 2009.
U.S. Appl. No. 12/602,577, filed Dec. 1, 2009.
U.S. Appl. No. 12/602,730, filed Dec. 2, 2009.
U.S. Appl. No. 12/776,155, filed May 7, 2010.
U.S. Appl. No. 13/061,558, filed Mar. 1, 2011.
U.S. Appl. No. 13/061,567, filed Mar. 1, 2011.

Written Opinion of the International Searching Authority and International Search Report, PCT/EP2008/056968, mailed Oct. 7, 2008.
Written Opinion of the International Searching Authority and International Search Report, PCT/EP2008/054401, mailed Sep. 11, 2008.
Written Opinion of the International Searching Authority and International Search Report, PCT/EP2008/056310, mailed Oct. 8, 2008.
Written Opinion of the International Searching Authority and International Search Report, PCT/EP2008/056412, mailed Sep. 11, 2008.
Written Opinion of the International Searching Authority and International Search Report, PCT/EP2008/054810, mailed Oct. 24, 2008.
European Search Report, EP 09174573.7, mailed Apr. 9, 2010.
Chilean Patent Application No. CL-1652-2008, filed Jun. 5, 2008 (English in U.S. equivalent 2010/0173056 and WO2008/148601).
Chilean Patent Application No. CL-1653-2008, filed Jun. 5, 2008 (English in U.S. equivalent 2010/0186599 and WO2008/148604).
Chilean Patent Application No. CL-1655-2008, filed Jun. 5, 2008 (English in U.S. equivalent 2010/0178404 and WO2008/148646).
Written Opinion of the International Searching Authority and International Search Report, PCT/EP2008/056345, mailed Oct. 1, 2008.
Non Final Office Action, U.S. Appl. No. 12/602,577, dated Mar. 20, 2012.
Non Final Office Action, U.S. Appl. No. 12/602,562, dated Feb. 13, 2012.
Non Final Office Action, U.S. Appl. No. 12/602,542, dated Apr. 13, 2012.
Non Final Office Action, U.S. Appl. No. 12/602,730, dated May 17, 2012.
Non Final Office Action, U.S. Appl. No. 12/860,705, dated Mar. 16, 2012.
Restriction Requirement, U.S. Appl. No. 12/602,553, dated May 11, 2012.
Green Mountain coffee, New K-Cup Samplers Offer More Variety; Jul. 11, 2008, pp. 1-5. Accessed Mar. 6, 2012 from http://www.greenmountincafe.com/2008/07/new-k-cup-samplers-offer-more-variety/.
Non Final Office Action, U.S. Appl. No. 13/061,558, dated Dec. 6, 2012.
Final Office Action, U.S. Appl. No. 12/602,542, dated Oct. 4, 2012.
Final Office Action, U.S. Appl. No. 12/602,730, dated Sep. 18, 2012.
Non Final Office Action, U.S. Appl. No. 12/602,553, dated Aug. 23, 2012.
Non Final Office Action, U.S. Appl. No. 12/776,155, dated Jul. 18, 2012.
Final Office Action, U.S. Appl. No. 12/602,562, dated Jun. 22, 2012.
Final Office Action, U.S. Appl. No. 12/860,705, dated Jul. 18, 2012.

* cited by examiner

SINGLE-USE CAPSULE FOR PREPARING A FOOD LIQUID BY CENTRIFUGATION

This application is a 371 filing of International Patent Application PCT/EP2008/056345 filed May 23, 2008.

BACKGROUND

The present invention relates to a capsule containing a food substance for preparing a food liquid such as a beverage using centrifuge forces exerted on the capsule. The invention also relates to a system comprising the capsule and a device arranged for receiving the capsule and for preparing the food liquid.

It is known to prepare beverages wherein a mixture consisting of brewed coffee and coffee powder is separated with centrifugal forces. Such a mixture is obtained by bringing hot water and coffee powder together for a defined time. The water is then forced through a screen, on which screen powder material is present.

Existing systems consist of placing the coffee powder in a receptacle which is usually a non-removable part of a machine such as in EP 0367 600B1. Such devices have many disadvantages. Firstly, the coffee powder must be properly dosed by hand in the receptacle. Secondly, the centrifuged coffee waste becomes dry and it must be removed by scraping the surface of the receptacle. As a result, the coffee preparation requires a lot of manual handling and is so very time consuming. Usually coffee freshness can also vary a lot and this can impact on the cup quality because coffee comes generally from bulk package or coffee is ground from beans in the receptacle itself.

Also, depending on the manual dosage of coffee and the brewing conditions (e.g., centrifugal speed, receptacle size) the cup quality can vary a lot.

Therefore, these systems have never reached an important commercial success.

In German patent application DE 102005007852, the machine comprises a removable holder into which an open cup-shaped part of the receptacle is placed; the other part or lid being attached to a driving axis of the machine. However, a disadvantage is the intensive manual handling. Another disadvantage is the difficulty to control quality of the coffee due to a lack of control for the dosing of the powder and a lack of control of the freshness of the coffee powder.

Other devices for brewing coffee by centrifuge forces are described in WO 2006/112691; FR2624364; EP0367600; GB2253336; FR2686007; EP0749713; DE4240429; EP0651963; FR2726988; DE4439252; EP0367600; FR2132310; FR2513106; FR2487661; DE3529053; FR2535597; WO2007/041954; DE3529204; DE3719962; FR2685186; DE3241606 and U.S. Pat. No. 4,545,296.

However, the effect of centrifugal forces to brew coffee or prepare other food substances presents many advantages compared to the normal brewing methods using pressure pumps. For example, in "espresso" coffee-type brewing methods, it is very difficult to master all the parameters which influence the quality of extraction of the delivered coffee extract. These parameters are typically the pressure, the flow rate which decreases with the pressure, the compaction of the coffee powder which also influences the flow characteristics and which depends on the coffee ground particle size, the temperature, the water flow distribution and so on.

Therefore, there is a need for proposing a new extraction process and a capsule adapted therefore for which the extraction parameters can be better and more independently controlled and therefore can be better mastered for controlling quality of the delivered food liquid.

At the same time, there is a need for a way of preparing a food liquid which is more convenient compared to the prior art centrifugal coffee preparation devices and which provides a better in-cup quality with a higher control of important quality parameters such as freshness and accurate dosage of the substance in the receptacle.

SUMMARY OF THE INVENTION

The present invention overcomes the problems of the prior art by providing a single-use capsule for preparing a food liquid from a food substance contained in the capsule by introducing water in the capsule and passing water through the substance using centrifugal forces for producing the food liquid which is centrifuged peripherally in the capsule relatively to a central axis of the capsule corresponding to an axis of rotation during the centrifuging operation comprising:
- an enclosure containing a predetermined amount of food substance,
- a plurality of outlet openings of the enclosure for enabling the food liquid to leave the enclosure under the centrifugal forces exerted in the capsule during centrifugation, said outlet openings being arranged at a peripheral portion of wall of the enclosure.

Preferably, the outlet openings are positioned and substantially distributed radially in said portion of wall about the central axis.

Preferably, in order to prolong the freshness of the substance in the capsule during storage, the capsule is made of gastight material. Furthermore, the capsule comprises a sealing foil arranged between the outlet openings and the external environment for closing the capsule in a gastight manner.

In a particular mode, the plurality of outlet openings is provided through an internal portion of wall in the capsule. For instance, the internal portion of wall comprising the outlet openings is closed from the external environment in a gastight manner before the capsule is opened for use in the beverage production device.

Preferably, a collecting recess is provided downstream of the outlet openings of the enclosure to collect the liquid exiting the enclosure in a homogeneous flow. The collecting recess is also preferably an annular portion placed at the periphery of the capsule. The collecting recess is preferably closed on one side by the internal portion of wall and at another side by the sealing foil.

The capsule of the invention is thus designed to enable a liquid to be prepared from a substance contained in an enclosure of the capsule by the effect of centrifugation obtained by rotating the capsule around an axis of rotation which is proper to the capsule.

The plurality of openings provided in the capsule are thus properly arranged for letting the centrifuged liquid leave the enclosure at a location which is substantially peripheral on the enclosure around the axis of rotation of the capsule. Depending on the size of the openings, the plurality of openings may also be given a function to filter the liquid from the solid particles that may be contained in the enclosure such as coffee particles. Furthermore, also when openings are particularly small, i.e., lower than 200 microns, a certain pressure drop, i.e., of about 0.5 to 4 bar, can be created at the peripheral portion of wall.

According to an aspect of the invention, the plurality of outlet openings comprises a series of slots and/or holes provided in said peripheral portion of wall. Slots may be appropriate as they can allow release of liquid at a suitable flow rate while restraining the passage of solid particles.

When slots are provided, the slots may be aligned, e.g., parallel to each other, in at least one array along a peripheral portion of wall of the enclosure. The slots may be of a relatively small length, e.g., of from 0.5 to 5 mm and a small width, e.g., of from 0.08 to 0.6 mm.

Preferably, each of the outlet openings has a diameter or width which is smaller than the average size of the particles forming the food substance.

Therefore, the openings can have a filtering function 'per se'.

The pressure drop at the portion of wall also depends on the size of the openings, the number of openings and the total passage surface area. Therefore, the size of the opening can be designed in the portion of wall to produce a certain pressure drop in the capsule itself. This enables to maintain a certain pressure in the enclosure and so improves the interaction between the food substance and water. Depending on the size of the openings and the centrifugal parameters such as the rotating speed, the characteristics of the beverage can also be tailored, in particular, for coffee beverages. The diameter or width of the openings may be between 1 and 800 microns, preferably between 10 and 600 microns. The overall surface area of the openings of the peripheral portion of wall is also preferably lower than 50% of the total surface area of said portion of wall, most preferably lower than 40%. In a mode the total surface area of the openings is comprised between 5 and 200 mm$^2$, preferably between 10 and 50 mm$^2$.

A significant pressure drop at the peripheral portion of wall can be obtained when the width or diameter of the holes are less than 200 microns, e.g., between 1 and 200 microns. A pressure drop of from about 1 to 4 bar, more preferably of from 2 to 3 bar, above the atmospheric pressure can be successfully obtained at the portion of wall. For coffee, a liquid extract with a high solids concentration comparable to a ristretto, espresso or lungo-type coffees can be successfully brewed within this range of pressures.

A lower pressure drop is obtained, e.g., lower than 1 bar when the openings have a width or diameter at or above 200 microns and if no flow restriction is placed in the flow path such as an additional valve placed within the liquid flow path in the device that would create a higher pressure drop. In case of a low pressure drop in the liquid flow path, the portion of wall with the large outlet openings can serve to retain the solid particles in the enclosure. However, the liquid tends to leave more quickly the enclosure (i.e., a higher flow rate is created) and less interaction takes place between water and the substance in the enclosure. For coffee, this may lead to a lower solid and aroma concentration of the coffee extracts comparable to a filter-type coffee.

In a possible mode, the portion of wall with the outlet openings can be formed from a paper filter or woven, non-woven fibres, meshed material, porous polymer membrane or combination thereof. In this case, part of the portion of wall can be formed by a band or different parts of the filter, fibres or meshed material. The meshed material can be of metal and/or polymeric wires, for instance. The fibres can be a fabric of polymer and/or natural fibres. In these different cases, the openings can be formed of the pores formed between the fibres of the material. In particular, polymer woven or meshed material or a porous polymer membrane can be both tear resistant and designed with a low porosity, i.e., lower than 200 microns, more preferably between 1 and 100 microns, for providing a significant pressure drop, i.e., within about 1-4 bar. A suitable material can be a PET woven membrane.

In the preferred modes, the capsule also comprises a circumferential beverage collecting recess. The recess can be placed downstream of said plurality of outlet openings, in particular, for collecting the liquid which is projected by centrifugation to the walls of the enclosure and that passes through the outlet openings. The recess can be closed by the sealing lid. Therefore, before leaving the capsule, the centrifuged liquid that leaves the enclosure is collected in the collecting recess. This can ensure that a more homogeneous flow of the liquid leaves the capsule. The recess is also provided to allocate sufficient space in the capsule for enabling piercing members of the beverage preparation device to be introduced in the capsule for making beverage outlets.

According to preferred modes of the capsule, a dished body is provided. The body has, preferably, a sidewall ending by a larger opening section and a closed bottom wall of smaller section. The sidewall thus widens in direction of the opening end. Preferably, a lid is assembled onto the dished body to close the open end of the body and thus to define with the body, an enclosure which contains the food substance. In particular, the portion of wall comprising the outlet openings can be part of the lid. Such a configuration is relatively simpler to industrially produce and assemble.

In a particular mode, the lid comprises at least one portion of the peripheral recess forming a means for collecting the beverage passing through the outlet openings. For example, the capsule comprises at its periphery, an annular groove of U-shaped section opening outwards, i.e., in a direction opposed to the inside of enclosure, and forming the collecting recessed means. The groove is provided with an inner portion of wall into which are provided the openings, e.g., a series of peripheral slots. The groove can further comprise an outer portion forming an engaging edge which bears onto an inner bearing portion of the dished body. The engaging edge can form a sufficiently sealed interface with the bearing portion of the dished body for preventing liquid from by-passing the openings.

The collecting recess can extend continuously at the periphery of the lid for enabling the centrifuged liquid to better distribute outwardly before leaving the capsule.

In an alternative mode, the collecting recess can be part of the body. For example, the body can be a thermoformed plastic member including the recess. Preferably, the recess is placed at the widened open section of the body.

In a preferred mode, a gastight sealing foil covers at least a portion of the lid. In particular, the sealing foil covers at least the collecting recess. The collecting recess can thus be gas tightly closed before the capsule is used in the beverage production device. As a result, no air from the external atmosphere actually enters the capsule, before its use, through the outlet openings provided in the enclosure, e.g., through the inner portion of lid. The substance, such as coffee or milk, is thus less subject to possible oxidation.

In a mode, the sealing foil is permanently sealed onto the dished body and/or lid and is so made puncturable by piercing water injection means. At the same time, one or more outlets can be formable in the foil for enabling the liquid to leave the capsule, for example, by piercing with one or more piercing/puncturing member foreign to the capsule, e.g., several needles of the beverage production device. For instance, three or four outlets can be pierced in the foil in the region of the collecting recess to enable the centrifuged liquid to leave the capsule an equal number of streams. In another mode, the sealing foil is removably sealed onto the dished body and/or lid and is thus made peelable. In such case, the foil is removed before being inserted in the beverage production device.

In order to enable the sealing foil to be applied onto the dished body, the dished body comprises a peripheral rim for sealing of the foil. Sealing can be applied by ultrasounds or thermal welding for example.

The lid of the capsule can therefore form an inner member which is assembled into the dished body such as by simple insertion or by additional connection means such as welding. When a sealing foil is assembled onto the lid and sealed to the rim of the dished body, the lid can be simply inserted onto a seat of the body, e.g., at the peripheral inner edge of the dished body without further connection, since the foil sealed with sufficient tension at the rim, can prevent the lid from dislodging from the seat of the body.

In additional features of the invention, the lid can comprise at least one inlet port defining a passage for a water injector to be introduced in the capsule. The inlet port in the lid may be normally closed by a puncturable small portion of plastic wall, or can be left open. It may be advantageous to maintain the inlet port closed, e.g., by a breakable plastic part, for preventing substance such as coffee particles from freely leaving the enclosure and occupying the interstice between the lid and the sealing foil. The inlet port is aligned at the central axis of rotation of the capsule. Indeed, when the port is aligned, the water injection part of the beverage production device may be a fixed part of the device and not a rotating part. This greatly simplifies the construction of the device. In another possible feature, the inlet port forms a tubular portion that widens in the direction of the enclosure. Widening of this portion promotes the ejection of water inside the enclosure during the centrifugation.

In the context of the invention, the capsule can contain food substances among a large choice of food ingredients or mixtures of food ingredients.

In particular, the substance can be chosen among the ingredients consisting of: ground coffee, soluble coffee, dairy based powder, dairy or non-dairy creamer, cocoa, sweetener, leaf tea, herbal tea, soluble tea, culinary powder, soluble or dispersible nutritional composition, liquid food concentrate and combinations thereof.

The capsule can be formed of gastight packaging materials for maintaining the freshness of the substance in the capsule as long as possible. In particular, the dished body can be formed of food grade plastics and at least one gas barrier layer.

For example, the dished body is a thermoformed plastic laminate comprising at least one layer of polypropylene (PP) and at least one EVOH gas barrier layer. The dished body and/or lid can be thermoformed or injected in plastics. The lid can be also a porous membrane made of polymer such as PET. In an alternative, the body and/or lid can be deep drawn from thin metal such as aluminium alloy or a complex of plastic and aluminium alloy.

The invention also relates to a capsule for preparing a food liquid from a food substance contained in the capsule by introducing water in the capsule and passing water through the substance using centrifugal forces for producing the food liquid which is centrifuged peripherally in the capsule relatively to a central axis of the capsule corresponding to an axis of rotation during the centrifuging operation comprising:
    a cup-shaped body for receiving a predetermined amount of food substance,
    a portion of wall for delimiting with the body an enclosure containing a food substance, said portion of wall comprising at its periphery a plurality of openings for enabling the food liquid to leave the enclosure under the effect of centrifugation,
    a closing membrane connected to the body for closing the capsule in a gas-tight manner and,
    a collecting recess between said portion of wall and said closing membrane.

The invention also relates to a system for preparing a liquid food from a food substance contained in a receptacle by passing water through the substance using centrifugal forces comprising:
    a device for receiving the receptacle, said device comprising means for driving the receptacle in centrifugation around an axis of rotation,
    the receptacle is removable and forms a single-use capsule which comprises an enclosure with a portion of wall comprising a plurality of radial or peripheral outlet openings.

BRIEF DESCRIPTION OF THE DRAWINGS

Additional features of the invention will appear in the detailed description of the figures, in which.

DETAILED DESCRIPTION OF THE INVENTION

Figure 1:
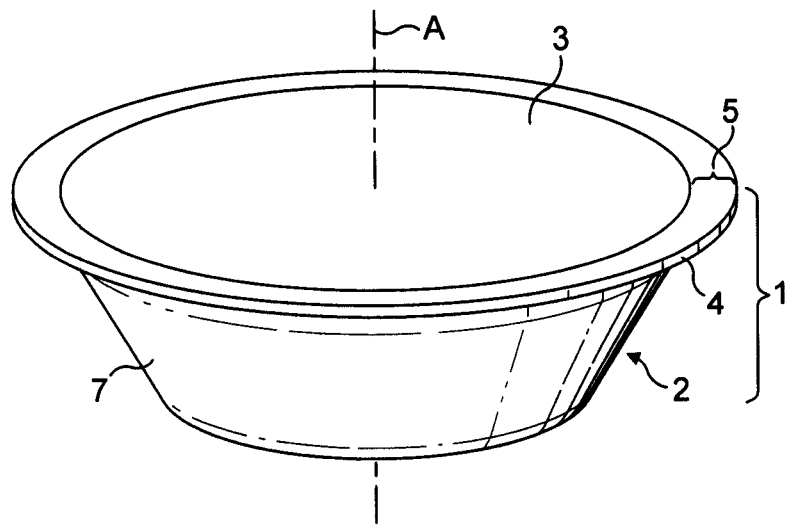
FIG. 1 is a perspective view from above of a capsule of the invention.
Figure 2:
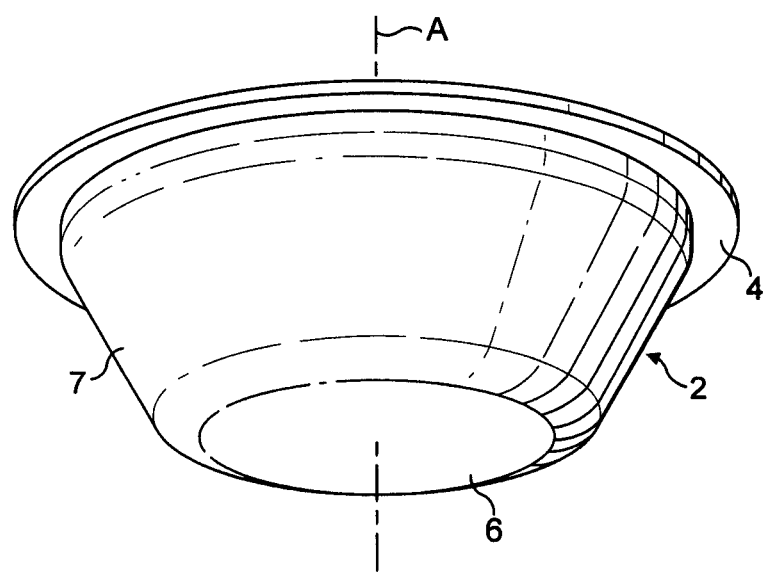
FIG. 2 is a perspective view from below of the capsule of the invention.
Figure 3:
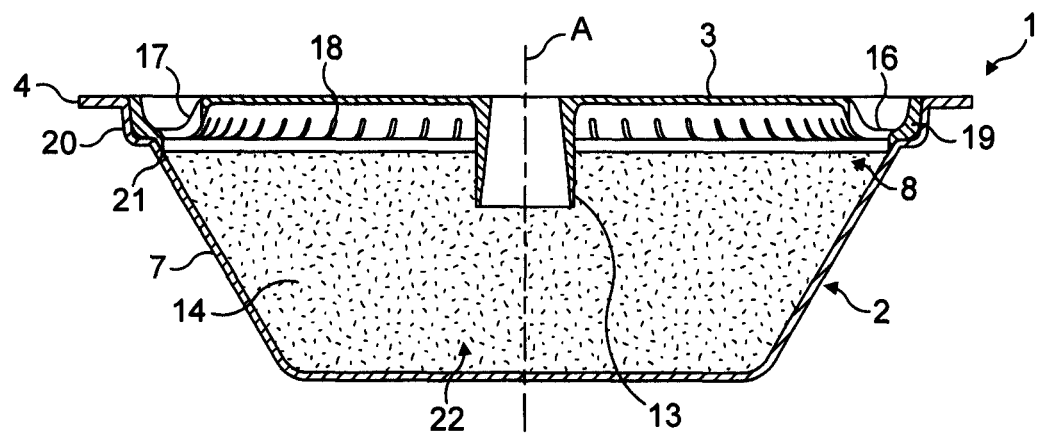
FIG. 3 is a cross section view of the capsule of the invention.
Figure 4:
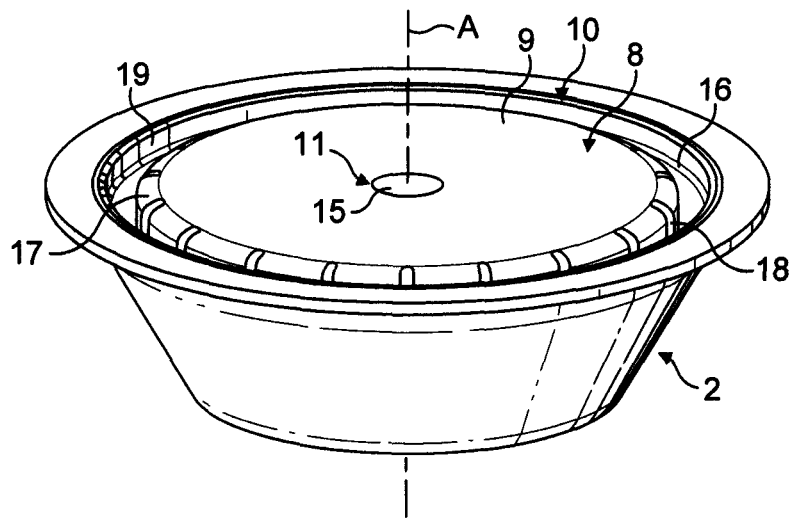
FIG. 4 is perspective view of the capsule with the sealing foil removed.

As shown in FIGS. 1 and 2, a preferred capsule 1 of the invention generally comprises a dished body 2 onto which is sealed a sealing foil 3. The sealing foil 3 is sealed onto a peripheral rim 4 of the body at a sealing annular portion 5. The rim 4 can extend outwards forming a small annular portion, e.g., of about 2-5 mm. The dished body comprises a bottom wall 6 and a side wall 7 which preferably widens in direction of the large open end of the body opposed to the bottom wall. The dished body is preferably rigid or semi-rigid. It can be formed of food grade plastics, e.g., polypropylene, with a gas barrier layer such as EVOH and the like or aluminium alloy or a complex of plastic and aluminium alloy. The sealing foil 3 can be made of a thinner material such as a plastic laminate also including a barrier layer or aluminium alloy or a combination of plastic and aluminium alloy. The sealing foil is usually of a thickness between 50 and 250 microns, for example. The sealing foil member can be pierced for creating the water inlet and the beverage outlet(s) as will be described later in the description.

Figure 5:
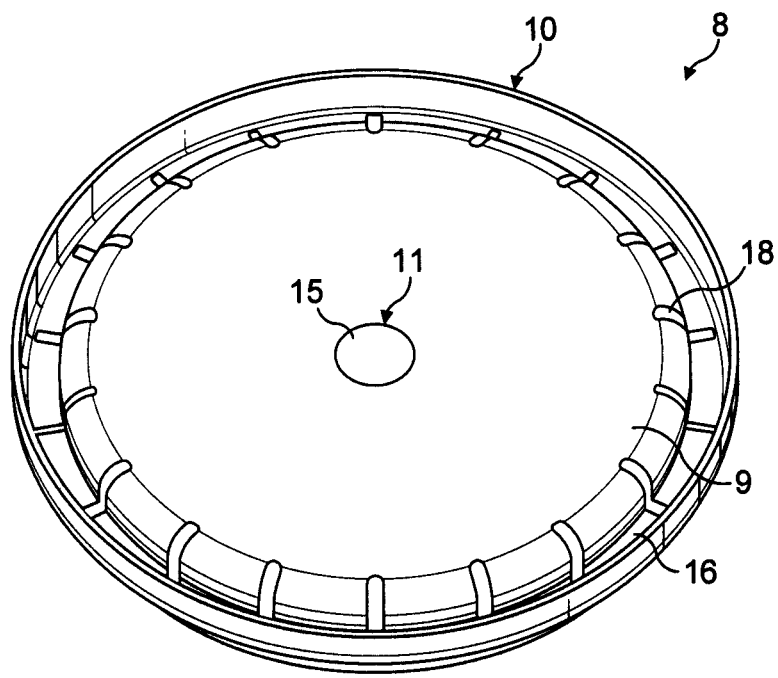
FIG. 5 is a perspective view of the lid from above of the capsule of the invention.
Figure 6:
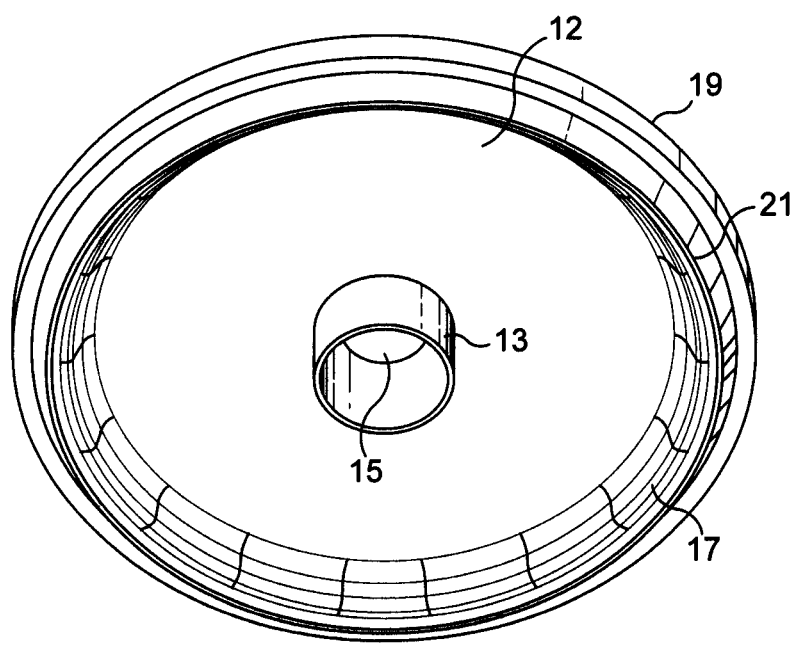
FIG. 6 is a perspective view of the lid from below of the capsule of FIG. 4.

In relation to the embodiment of FIGS. 3 to 6, the capsule of the invention comprises an inner member forming a lid 8 which is inserted in the dished body. The lid 8 and body 2 delimit together an internal enclosure 14 for receiving the food substance 22. Preferably, the capsule forms a symmetry of revolution around a central axis A. However, it should be noted that the capsule may not necessarily have a circular section around axis A but may take another form such as a square or a polygonal form. The lid 8 is illustrated in FIGS. 5 and 6. The lid can take the form of a disc of plastic comprising a central portion 9 and a peripheral portion 10. The central portion can be substantially flat and may comprise a inlet port 11 for enabling the introduction of a water injection member of the beverage production device. In the internal side 12 of the lid, the inlet port can extend by a tubular inlet portion 13 which serves for ensuring the water is guided toward the direction of the bottom of the body to ensure complete wetting of the substance in the enclosure and so reduced risk of leaving for example "dry powder spots". Preferably, the inlet port is closed by a breakable or puncturable closure part 15. This part serves to prevent substance of the enclosure from filling the interstice between the upper surface of the lid and the sealing foil.

The lid further comprises a peripheral portion 10 including a collecting recess 16. The collecting recess forms a U-shape in transversal section (FIG. 3) which opens in the direction of the sealing foil. The recess is preferably continuously extending at the periphery of the lid although it can be replaced by several discontinuous recessed portions which may be separated by reinforcing elements or walls, for example. The collecting recess comprises an inner peripheral portion of wall 17 into which is provided a series of outlet openings 18 forming a fluid communication between the enclosure 14 and the collecting recess 16.

As illustrated in this example, the openings may be slots or holes which are distributed at intervals in the inner peripheral portion of wall 17. For example, the number of slots can range of from 5 to 200, preferably of from 10 to 100. These slots have preferably a width that is smaller than the statistical average size of the particles of the substance. For example, the slots have a width of less than 600 microns, more preferably less than 500 microns, most preferably less than 250 microns, for a substance which is ground coffee. The slots may extend if necessary on the central portion 9 or in the bottom of the recess 16. The slots can be replaced by holes of circular section having a diameter smaller than the statistical average size of the particles of the substance.

Figure 13:
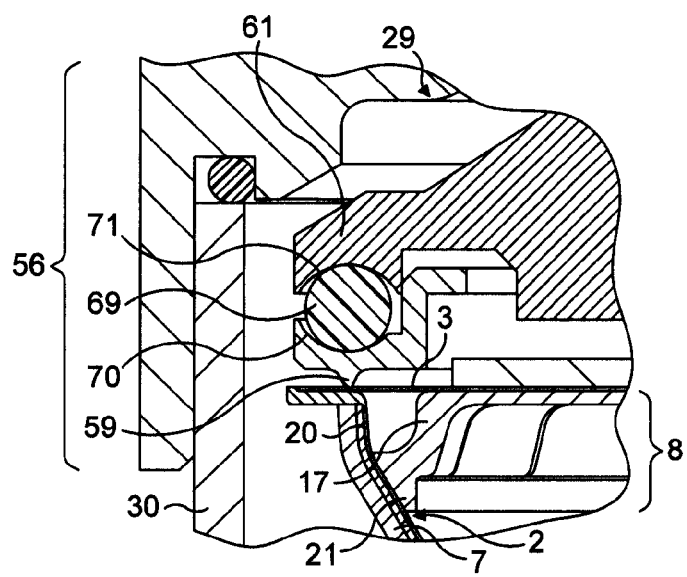
FIG. 13 is a detail view of the module of FIG. 12.

The collecting recess 16 forms a peripheral groove of small depth, e.g., between 2 and 10 mm to allow the introduction of piercing members through the sealing foil to produce outlets for the brewed liquid which is produced in the capsule as will explained later in the description. The collecting recess 16 further comprises an outer peripheral portion 19 forming an edge bearing onto a seat portion 20 of the dished body. The outer portion 19 can be engaged in the seat portion 20 by a more or less tight fit engagement. An additional sealing portion 21 extending along the internal surface of the side wall of the body and in the direction of the bottom of the dished body can extend from the recess to create further sealing against possible ingress of liquid between the lid and the inner surface of the body of the capsule. Of course, the form of the collecting recessed means can take different configurations without departing from the scope of the invention. For example, the recess 16 can be formed by the lid 8 and the side wall 7 of the dished body (as illustrated in FIG. 13). In this case, the outer peripheral portion 19 can be omitted.

As illustrated in the figures, the series of outlet openings, e.g., slots 18, are preferably placed at or close to the widening part of the enclosure relative to the central axis A. Therefore, the centrifuged liquid will tend to be guided along the inner surface of the side wall of the body, up to the inner side 12 of the lid, and then through the slots. The lid 8 is fully closed by the sealing foil 3 when it is sealed onto the rim of the dished body. In a possible alternative, the sealing foil could cover only the collecting recess including the region of the slots.

It should be noticed that the lid 8 can be a rigid or semi-rigid member made of thermoformed or injected plastic for instance. However, this part could also be made of a flexible membrane which is sealed to the inner surface of the dished body without departing from the scope of the invention.

It can also be noticed that a filter wall can also be placed inside the enclosure against the inside surface 12 of the lid. A filter wall can provide an improved filtration, for example, for substance of very thin particle size or for delaying the release of the centrifuged liquid out of the enclosure by creating a higher pressure drop. A filter wall can be a paper filter or thin plastic film which is glued onto the surface 12 of the lid. The lid can be simply inserted in the dished shaped body or be fixed by any suitable connection means such as by ultrasonic welding.

Figure 7:
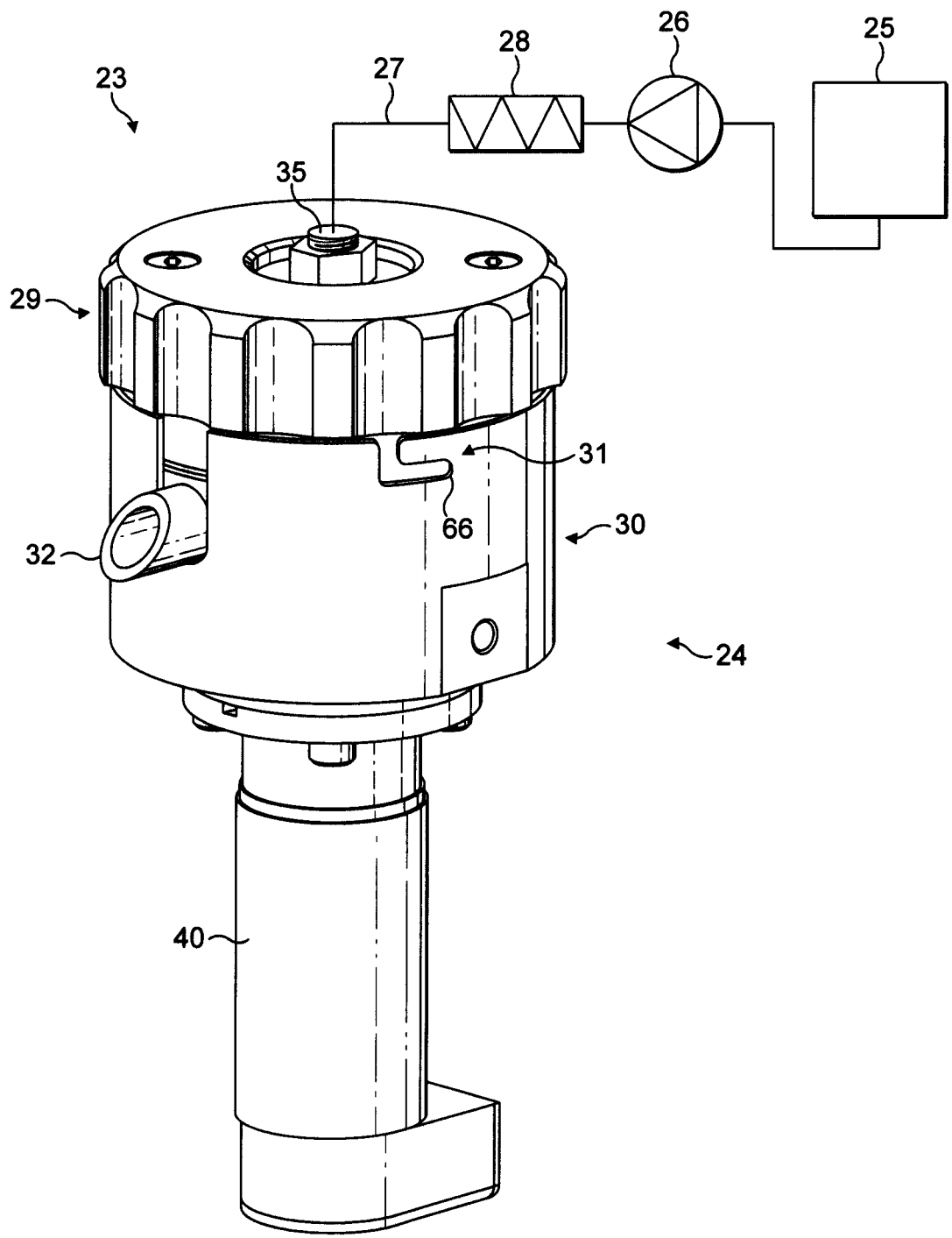
FIG. 7 is a perspective view of the beverage production device of the invention.
Figure 8:
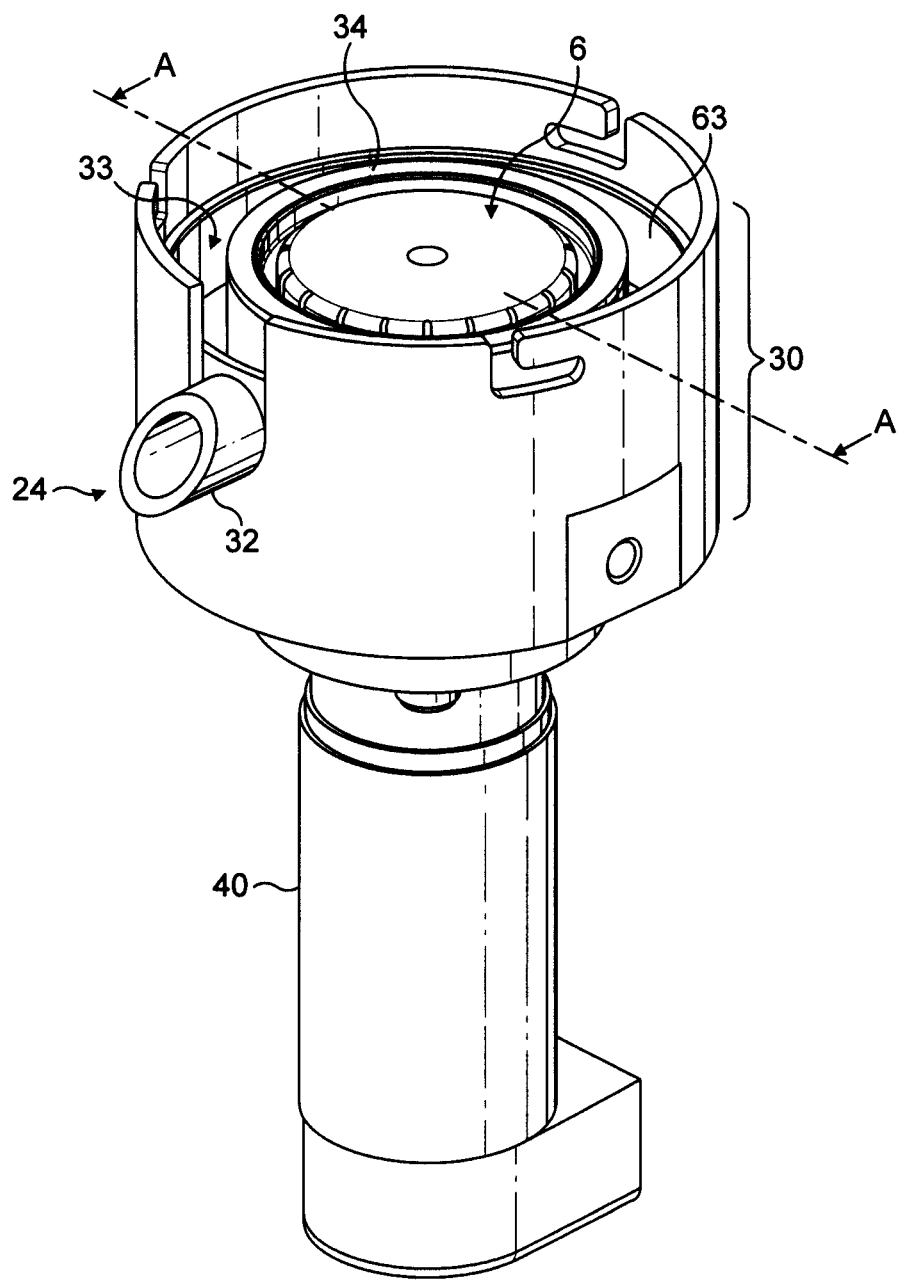
FIG. 8 is a perspective view of the beverage production module in open mode.

The system including a capsule of the invention and a beverage preparation device is illustrated in FIGS. 7 and 8 and described now.

Thus, the system comprises a capsule 1 as aforementioned and a beverage preparation device 23. The device has a module 24 into which a capsule can be inserted. The capsule contains a food substance for being brewed and the capsule is removed from the module after use for being discarded (e.g., for waste or recycling of the organic and inorganic raw materials). The module 24 is in fluid communication with a water supply such as a water reservoir 25. A fluid transport means such as a pump 26 is provided in the fluid circuit 27 between the module and the water supply. A water heater 28 is further provided to heat water in the fluid circuit before water enters the module. The water heater can be inserted in the fluid circuit to heat fresh water coming from the reservoir or alternatively can be in the water reservoir that becomes a water boiler in such case. Of course, water can also be taken directly from a domestic water supply via a water plug connection.

Water can be fed in the module 24 at low pressure or even gravity pressure. For example, a pressure of between 0 and 1 bar above atmospheric pressure can be envisaged at the water inlet of the module. Water at higher pressure than 2 bar could be delivered if a pressure pump is utilized such a piston pump.

The brewing module 24 can comprise two main capsule encasing sub-assemblies 29, 30; mainly comprising a water injection sub-assembly and a liquid receiving subassembly. The two assemblies' closes together to encase a capsule therein for example by a bayonet-type connection system 31. The liquid receiving subassembly 30 comprises a liquid duct 32, for example, protruding on a side of the subassembly for guiding the centrifuged liquid coming out of the capsule to a service receptacle such as a cup or glass. The liquid duct is in communication with a liquid receiver 33 forming a cylindrical wall placed at a short distance about a rotating drum 34 into which the capsule is inserted as illustrated in FIG. 8. The liquid receiver defines with the drum an intermediate cavity 63 for collecting the liquid as will be explained later in the description. Below the liquid receiving subassembly 30, are placed means for driving the capsule receiving drum 34 in rotation inside the subassembly.

The driving means comprise preferably a rotary motor 40 which can be supplied by electricity or gas power.

The water injection subassembly comprises a water inlet side comprising a water inlet 35 communicating upstream with the water fluid circuit 27.

Figure 9:
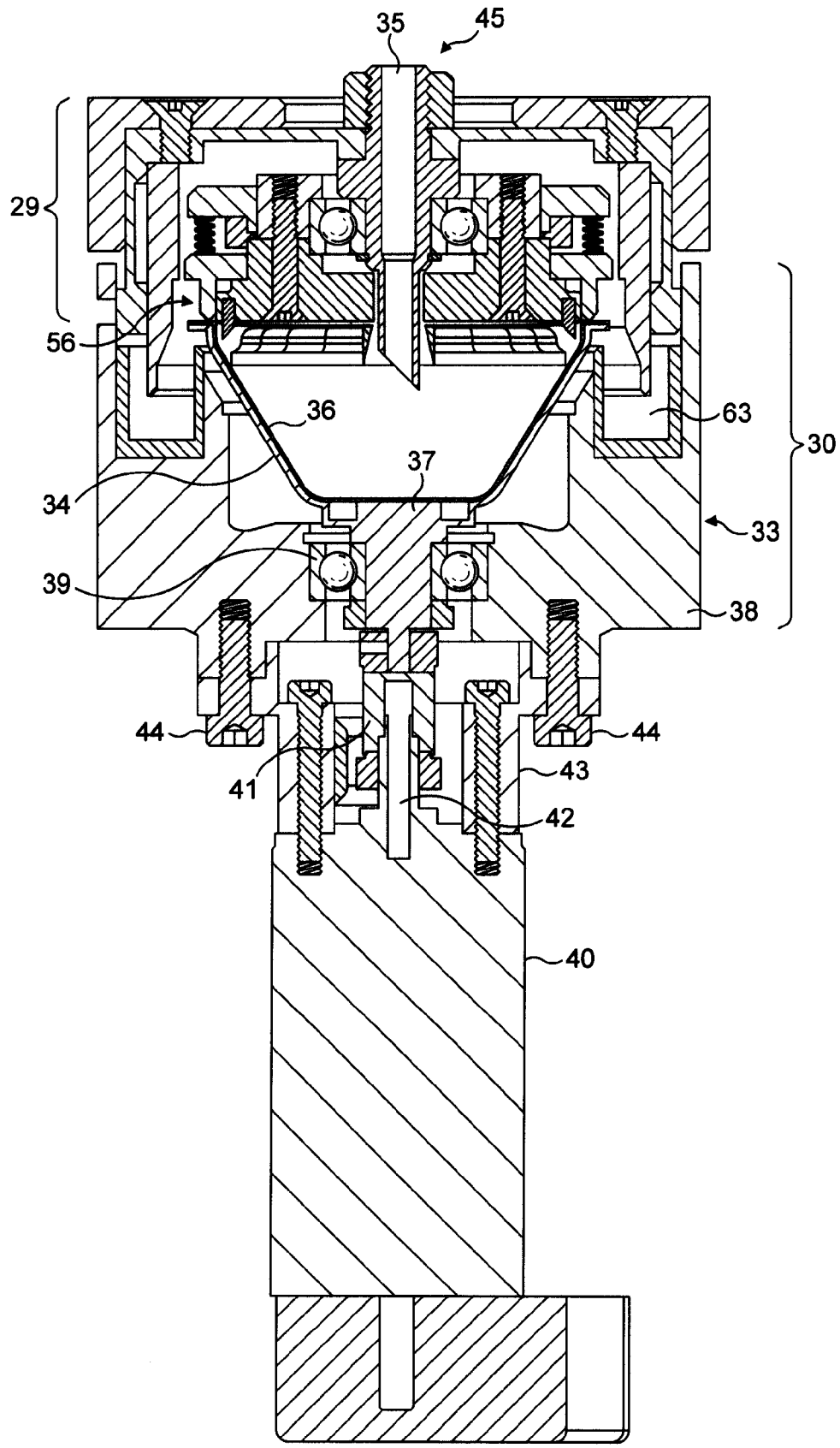
FIG. 9 is a cross-sectional view along line A-A of the beverage production module in a closed mode about the capsule.
Figure 10:
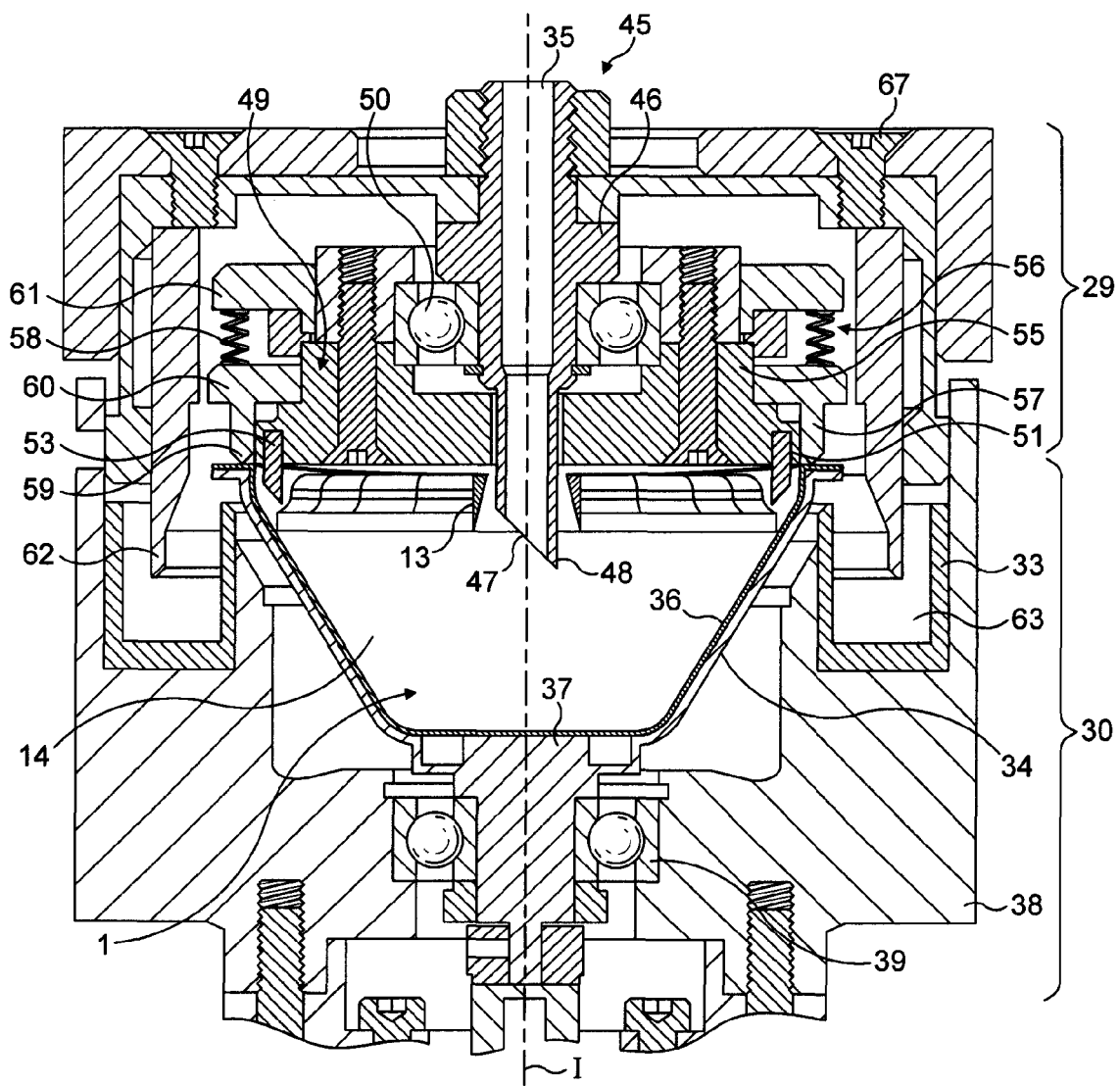
FIG. 10 is an enlarged view of the view of FIG. 9.

In relation to FIGS. 9 and 10, the rotary drum 34 is shaped as a hollow capsule holder with an internal cavity 36 complementary shaped to receive the capsule. The rotary drum 34 prolongs itself axially by a rotating shaft 37 which is maintained in rotational relationship relative to an outer base 38 of the liquid receiver 33 by a rotational guiding means 39 like a ball bearing or needle bearing. Therefore, the rotary drum is designed to rotate around a median axis I whereas the outer base 38 of the receiver is fixed relative to the device. The liquid receiver 33 can be fixed to a housing 43 of the motor by bolts 44 for example. A mechanical coupling 41 is placed at the interface between the rotating shaft 37 of the drum and the shaft 42 of the motor 40.

Figure 11:
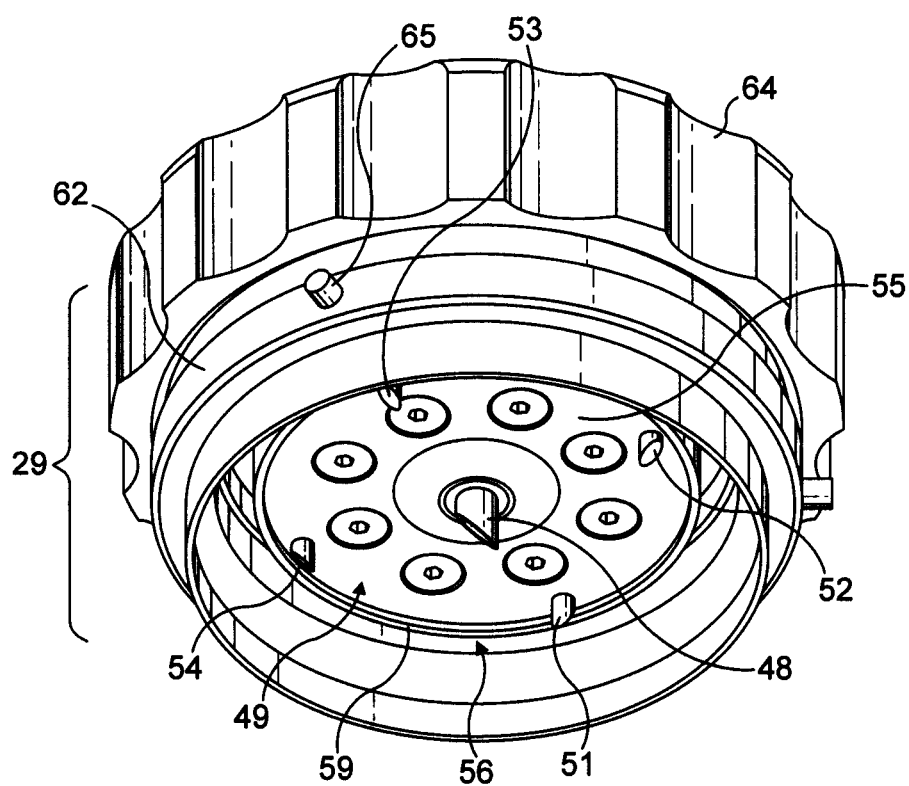
FIG. 11 is a view of the water injection assembly of the module of FIGS. 9 and 10.

Considering the water injection subassembly 29, as illustrated in FIGS. 10 and 11, it comprises a centrally arranged water injector 45 which is fixed relative to axis I. The water injector comprises a central tubular member 46 for transporting water from the inlet 35 to a water outlet 47 that is intended to protrude inside the enclosure 14 of the capsule. The water outlet is formed of a puncturing means 48 such as a sharp tubular tip that is able to create a puncture hole through the closing foil of the capsule and through the eventual breakable part of the tubular inlet 13 of the lid.

About the water injector is mounted a capsule rotary engaging part 49. The engaging part 49 has a central bore for receiving the water injector and rotational guiding means such as a ball or needle bearing 50 inserted between the part 49 and the injector 45. The engaging part further comprises outlet piercing members 51, 52, 53, 54 protruding from a disc-shaped engaging wall 55 of the part 49. The piercing members can be small cylindrical portions with a slanted cutting surface able to cut or perforate small holes in the sealing foil 3 of the capsule. The piercing members are arranged at the periphery of the wall 55, preferably evenly distributed to provide several openings in the capsule for the centrifuged liquid to leave the capsule forming several streams of liquid.

According to one aspect of the invention, the water injection subassembly 29 further comprises a valve system 56 for controlling the flow of liquid that is discharged from the device. The valve system 56 can be arranged on the capsule rotary engaging part 49 in the form of an annular engaging portion 57 which is biased under the force of elastic loading means 58 such as springs. The annular engaging portion 57 includes a pressing peripheral surface 59 which applies a closing force on the peripheral rim 4 of the capsule to be able to restrict the flow of liquid under the force of the elastic loading means. The surface 59 can form a cone or V for increasing the sealing pressure in a localized area. The engaging portion 57 further comprises an internal base portion 60. The elastic loading means 58 is thus inserted in a space located between the base portion 60 and a counter-force portion 61 of the engaging part 49. Therefore, at a rest position, the engaging portion 57 of the valve system keeps closing on the rim of the capsule under the compressive effect of the resilient means 58.

The capsule engaging subassembly 29 may further comprise a tubular portion of skirt 62 which protrudes in the internal annular chamber 63 of the liquid receiving subassembly 30 when the two subassemblies are closed relatively one another about a capsule. This tubular portion of skirt 62 forms an impact wall for the centrifuged liquid under pressure that passes through the valve system. This portion 62 is preferably fixed on the subassembly 29. The subassembly further comprises a handling portion 64 for facilitating the connection on the liquid receiving subassembly 30. This handling portion 64 can have a knurled peripheral surface for handling. The handling portion can be fixed on the fixed base of the subassembly 29 by screws 67. This portion could of course be replaced by a lever mechanism or a similar handling means.

As already mentioned, connection means are provided for the relative connection of the two subassemblies 29, 30. For example, small pins 65 are provided on the side of the tubular surface of the water injection subassembly 29 which can engage side locking openings 66 on the tubular surface of the liquid receiving subassembly 30. Therefore, connection between the two subassemblies can be carried out by a rotational angular or helicoidal closure movement for enabling the pins to engage the oblong openings 66. Of course, other connection means can be envisaged to replace this bayonet-type connection means. For instance, a threading means or a translational closure means can be envisaged by any person skilled in the art.

The capsule system of the invention works basically according to the following principle. The capsule device is opened by moving the two subassemblies 29, 30 relatively one another, e.g., by disconnecting the bayonet-type connection and separating the two subassemblies' 29, 30. As a result, a single-use sealed capsule 1 containing a food substance can inserted in the device, i.e., placed in the cavity of the rotating drum 36. The capsule can be placed in the device while the capsule being gas tightly closed by the sealing foil 3. The device is then closed by the subassembly 29 being connected back onto the subassembly 30 and locked by the connection means. In the locked position, the capsule is opened by the water injector that pierces through the sealing foil of the capsule and introducing itself through the water inlet 35 of the capsule. At the same time, several liquid outlets are pierced at the periphery of the sealing foil by the outlet piercing members 51-54. Water can thus be introduced in the capsule via the central water injector 45. Venting holes can be produced in the injection subassemblies to allow gas to escape the capsule while water is introduced in. The capsule can be driven in rotation by activating the rotary motor 40. The start of the centrifugal operation can be carried out at the same time as water injection start being introduced in the capsule or slightly after or before this water injection operation starts.

For instance, it might be advantageous for brewing ground coffee, to allow during several seconds that water fills in the capsule before starting the centrifugal operation by rotating the capsule. Thus, water can properly infiltrate in the coffee before, the liquid is centrifuged thereby avoiding coffee area to remain dry in the coffee portion. The centrifugation is carried out by rotating the capsule around the central axis I of rotation of the device that is preferably aligned to the central axis A of the capsule. The rotational speed is preferably of from 1000 to 16000 round-per-metre (rpm), more preferably of from 5000 to 10000 rpm. A control unit can be provided in the device for setting the rotational speed according to the nature of the liquid to be brewed and/or the substance in the capsule. The higher the rotational speed, the higher the pressure is exerted at the peripheral wall of the capsule by the liquid and the more substance is compacted on the sidewall of the capsule. It is important to notice that higher rotational speeds promote brewing of coffee extract containing a lower solid content since the residence time of liquid in the coffee bed is lower. Lower rotational speeds provide coffee of higher strength since the residence time of liquid in the capsule is higher. Brewing takes place in the capsule by water traversing the substance thereby providing an extraction or partial or total dispersion or dissolution of the substance. As a result, a centrifuged liquid is allowed to pass through the plurality of outlet openings 18 provided in the capsule, e.g., through the lid 8.

Under the effect of centrifugal forces, the substance, such as coffee powder, tends to compact itself radially whereas water is forced to flow through the substance. This results in the substance being both compacted and intimately wetted by water. Due to the high rotational movement of the capsule, the centrifugal forces exert themselves uniformly on the mass of the substance. Consequently, the water distribution is also more uniform compared to usual methods using a pressure pump to exert the pressure in the capsule. As a result, there is less risk of preferential flow path through the substance which could lead to areas which are not properly wetted and so not properly brewed, dispersed or dissolved. With ground coffee powder, the liquid that reaches the internal sidewall of the capsule is a liquid extract. This liquid extract is then forced to flow upwards along the internal surface of the sidewall of the capsule.

These outlet openings 18 of the enclosure are sized as a function of the substance stored in the capsule. Small openings such as slots of small width or holes of small diameter tend to provide a filtering function to retain the solid particles in the enclosure of the capsule while allowing only the liquid extract to pass the openings. These holes may also form sufficient small restrictions for creating shear forces and consequently generating foam or coffee crema. Some gas contained in the capsule can become entrapped in the liquid and forms, due to the pressure release after the restrictions, a multitude of small bubbles in the liquid. Some significant shear force of the centrifuged liquid may also be created at the pierced outlets with the needles.

The valve system 56 of the device can start opening as pressure of liquid increases on the valve when leaving the capsule. Therefore, a certain time delay of the opening can be controlled by the valve system to enable sufficient interaction between water and the substance contained in the capsule. This controlled delay depends on various parameters such as the centrifugal speed, the force exerted by the elastic loading means (i.e., spring stiffness), the pressure drop as created by the substance, outlets, etc. The opening of the valve system occurs by the pressing surface 59 of the valve system lifting as liquid pressure increase on its internal surface. It can be noted that the capsule of the rim can also be substantially flexible to flex under the effect of the pressure of liquid. Therefore, the relative movement between the pressing surface and the capsule create a small passage for the liquid to escape out of the small interstice upstream of the valve system. At relatively high rotational speeds, a jet of liquid can be formed that impacts on the internal surface of the portion of skirt 62. The liquid starts to fill the cavity 68 of the liquid receiving subassembly and liquid can drain through the liquid duct 32 to be collected in a cup or glass placed underneath.

Figure 12:
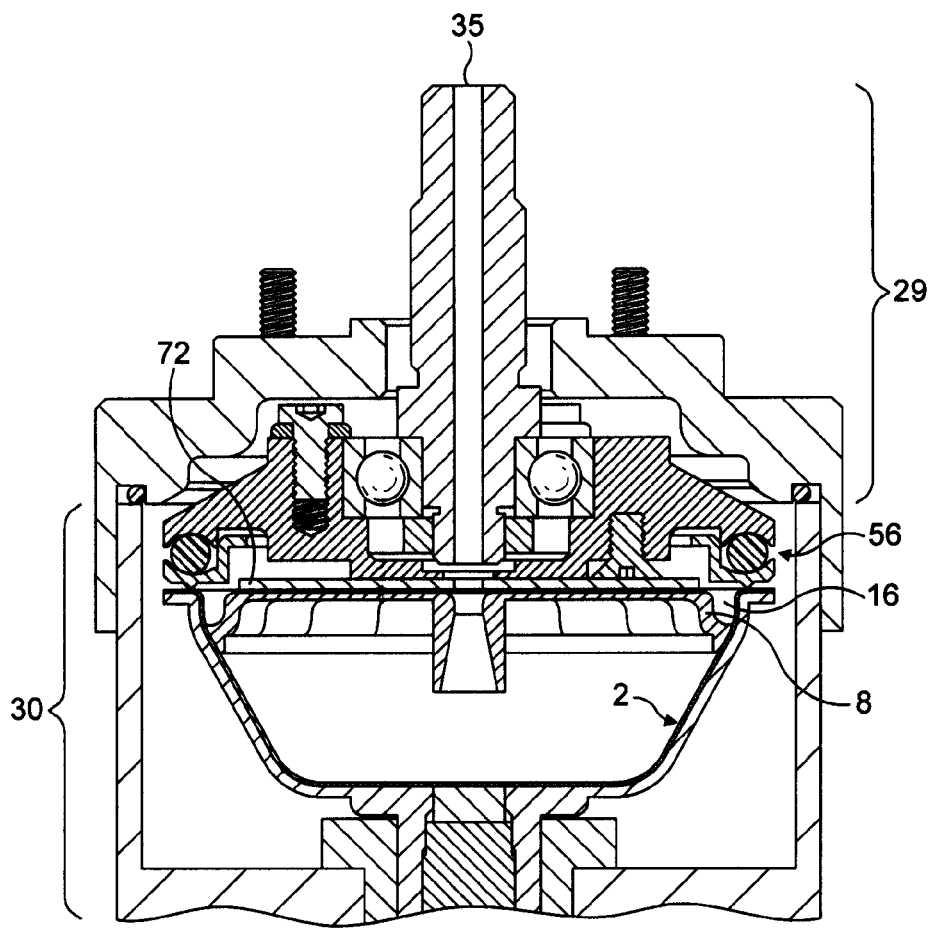
FIG. 12 is a cross sectional view of a beverage production module similar to FIG. 9 but for another embodiment of the invention.

In the other mode of the invention illustrated in FIGS. 12 and 13, the same numeral references have been taken to identify the same or equivalent technical means. In this mode, the valve system 56 differs in that the elastic loading means is obtained by a rubber elastic O-ring 69 inserting between a pinching surface 59 and a fixed portion 61 of the water injection subassembly 29. The O-ring is maintained between two concave portions 70, 71 of the valve system. Again during brewing, the pressure of liquid in the capsule tends to lift the pinching surface 59 to create a passage between the rim 4 of the capsule and the pinching surface. The pinching surface can be shaped with a sharp tip that can create a concentration of forces on the rim. Of course, it could be imagined that the elastic loading means and the pinching portion are the same element. For example, the pinching portion can be made of rubber-elastic material.

In the mode of FIG. 12 or 13, the water injector can be a simple water inlet in the capsule with no puncture means. In this case, the capsule is pre-opened before it is inserted in the device, i.e., the sealing foil is sealed to the rim of the body by a peelable sealing to enable the foil to be peeled. Alternatively, a central hole is perforated in the foil before the capsule is inserted in the device. Furthermore, a water-tight sealing engagement of the water injector can be performed by a water-tight sealing means 72 which applies a certain water-tight sealing pressure on the top surface of the capsule. Therefore, water is prevented from leaking along the top surface of the capsule and from by-passing the capsule to release directly through the liquid outlet.

Figure 14:
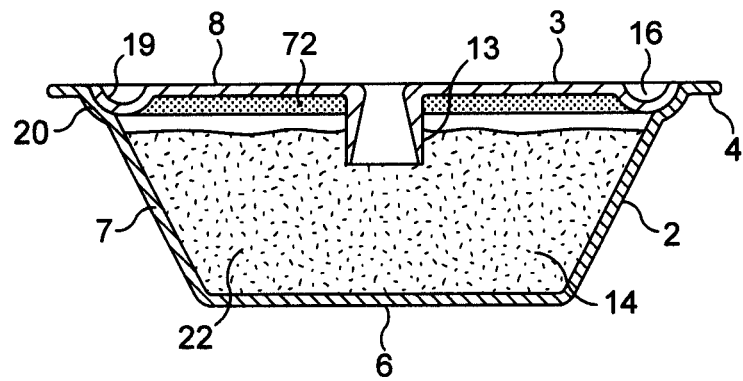
FIG. 14 is a cross section view of a variant of the capsule of the invention.
Figure 15:
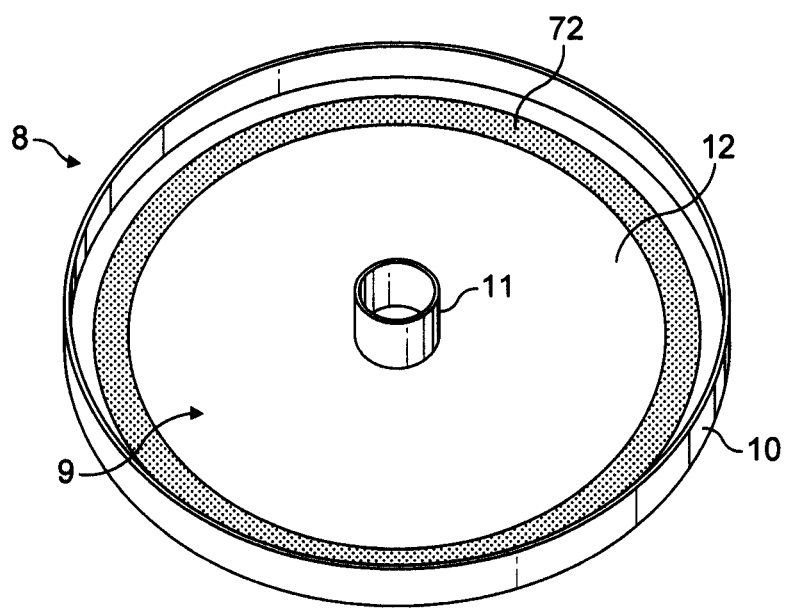
FIG. 15 is a view from underside of the lid of the capsule of FIG. 14.

The capsule of the invention can take various embodiments such as the one illustrated in FIGS. 14 and 15. The general structure of the capsule is the same as for the previous embodiment except that the outlet openings are formed by a filter paper, a woven or non-woven portion or another meshed or porous membrane 72. Thus, the lid 8 which is inserted in the dished body 2 comprises a circumferential band of a porous material. The porous material provides restriction of the flow, creating a certain pressure drop, e.g., of between 0.5 and 4 bars of relative pressure, and leading to a filtering of the solid particles. In particular, the size of the pores of the material can be chosen to retain also the coffee fines, i.e., the particles of particle size as low as 90 microns. The paper, fabric, meshed or porous material can be formed of a band or bands which can be welded or otherwise combined to the lid.

In another possible mode, the recess 16 can be filled by a porous compressible material to provide a filtering function as well. For example, the material could be sponge or fabric.

The system capsule of the invention provide remarkable brewing results with solid contents which are higher than with usual systems. The results are very reproducible from capsule to capsule. Surprisingly, crema is also remarkably improved with a creamier, more stable and thicker texture.

Figure 16:
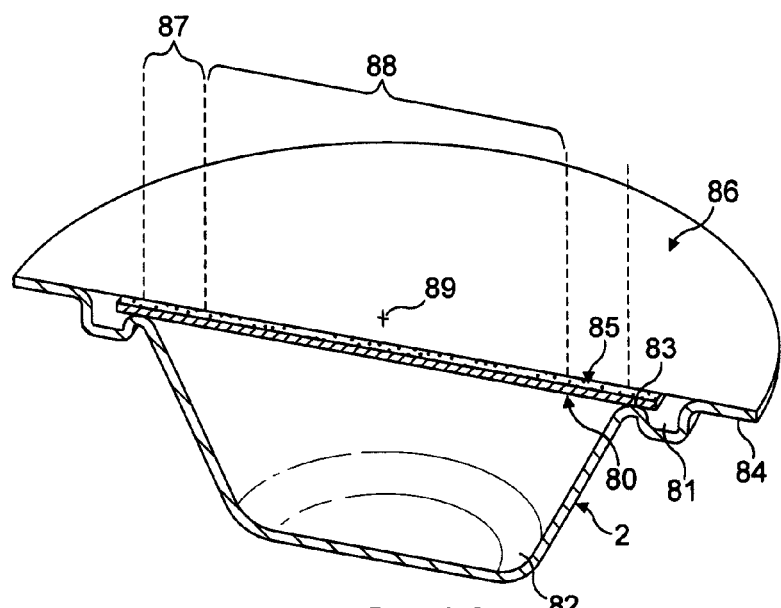
FIG. 16 is a perspective cross sectional view of a capsule according to another mode of the invention.
Figure 17:
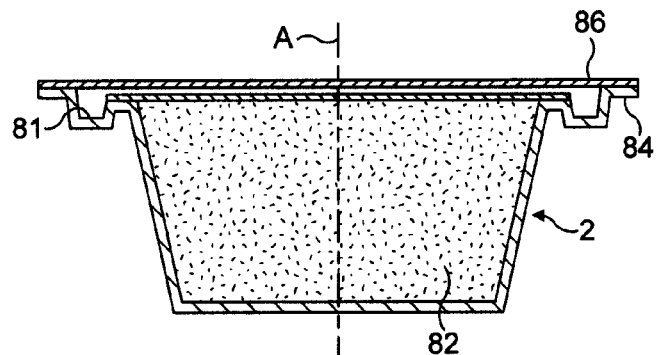
FIG. 17 is a cross sectional view of the capsule of FIG. 16.

According to FIGS. 16 and 17, the capsule of the invention may also comprise an enclosure which is formed of a dished body 2 and a porous wall 80. The dished body comprises a main cavity 82 for storing the food substance and a peripheral recess 81 for receiving the liquid extract that traverses the porous wall 80 during the centrifugation process. The recess 81 is delimited by an inner edge 83 and an outer rim 84. The porous wall 80 can be attached to an inner edge 83 of the recess 81. A gastight foil membrane 86 is preferably attached onto the outer rim 84 of the body. The inner edge is preferably placed below the outer rim in order to let a free space 85 between porous wall 80 and the foil membrane 86. The porous wall can be sealed by heat or ultrasonic welding onto the inner edge 83.

The porous wall 80 can have openings (i.e., pores) along its whole surface or along a peripheral portion of wall only. FIG. 16 shows a portion of the wall 87 which normally have the openings whereas the central portion 88 is free of openings.

In a different mode the two portions 87, 88 have the openings.

The pressure is dependent on various factors, in particular, the rotating speed of the capsule in the device, the radius at the peripheral portion of wall 87 (specially, determining the relative centrifugal force "g" at the portion 87) and the size of the openings. The size of the openings is preferably comprised between 1 and 600 microns. More preferably, the size of the openings is comprised between 10 and 200 microns forming a flow restriction means which creates a certain drop of pressure during the centrifugation of the capsule along its central axis. The overall surface area of the pores of the porous wall should be lower than 50% of the total surface area of said wall, most preferably lower than 40%.

The capsule of FIGS. 16 and 17 can be pierced in its centre 89 for injecting water in the enclosure 82 containing the substance. As a result both the outer foil 86 and the inner wall 80 are pierced. The capsule is inserted in a device as described before. The capsule is driven in centrifugal rotation at a determined speed, e.g., between 1000 and 16000 rpm, most preferably between 5000 and 12000 rpm. The brewing or dissolution process takes place in the enclosure by water traversing the substance. As a result of the centrifugal effect, the food liquid traverses the porous portion of wall 87, (eventually also part of the portion 88 if porous) and leaves the enclosure via the interspace 85 then via the annular recess 81. The liquid is allowed to leave the capsule via pierced holes made in the foil above the recess 81.

Figure 18:
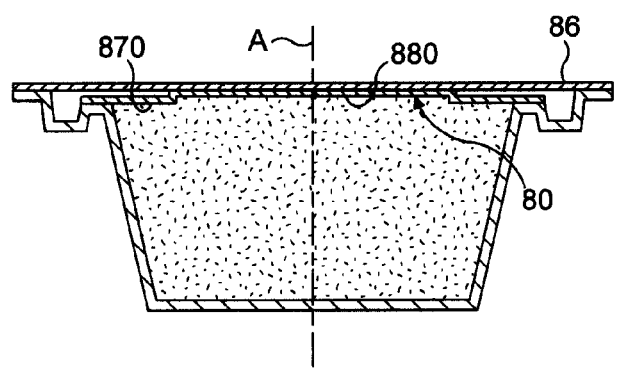
FIG. 18 is a cross sectional view of a capsule according to still another mode.

FIG. 18 shows a similar capsule but with the inner porous wall 80 comprising a central portion 880 which is sealed to the external gastight foil 86 and a peripheral portion 870 which is distant from the foil 86. In this example, the peripheral portion 870 comprises the outlet openings of the enclosure. The central portion 880 may have openings or may be free of openings. In this embodiment, no liquid is allowed to go between the outer foil 86 and the inner portion of wall 880 since both are sealed together. In a variant, a connection member can be inserted between these parts 880-86.

It can be noted that the peripheral portion of the capsule comprising the restriction means, e.g., openings, can be substantially oriented perpendicularly to the axis of rotation as in the examples of FIGS. 16 to 18 or inclined relative to said axis as in the example of FIGS. 1 to 6.

If a sufficient pressure drop is created at the portions of wall 870 in the capsule, the device may not necessarily be provided with an additional flow restriction means such as the valve described previously. In this case, the flow restriction means in the capsule suffices to maintain a sufficient pressure in the enclosure and so obtain a good interaction between the substance, e.g., ground coffee and water. For example, good espresso-type coffee with crema can be produced with a capsule comprising a woven polymer membrane comprising pores within a range of between 10 to 200 microns. In another possible mode, the flow restriction can be obtained or complemented by chicanes in the capsule or a similar structure forming a tortuous flow path for the liquid.

It can be noted that the pressure drop of the restriction means can be measured by a pressure measurement test consisting of filling water under pressure in the capsule and measuring the pressure of water at the injection point at which liquid is allowed to pass the restriction means, i.e., the valve system.

The term "food liquid" has here a broad meaning and encompasses: a culinary liquid such as soup or sauce, a beverage liquid such as coffee (ground and/or instant), chocolate, milk (powder and/or liquid), tea (instant and/or leaf), etc., or a nutritional liquid such as an infant formula and combinations thereof.

Of course, the invention may encompass many variants which are included in the scope of the patent claims that follow.

What is claimed is:

1. A single-use capsule configured for preparing a food liquid from a food substance contained in the capsule by introducing water in the capsule and passing water through the substance using centrifugal forces for producing the food liquid which is centrifuged peripherally in the capsule relatively to a central axis of the capsule corresponding to an axis of rotation during the centrifuging operation comprising:
    an enclosure delimited by a bottom wall, a widening sidewall arranged about the central axis and a lid forming a transversal upper wall, and containing therein a predetermined amount of food substance, wherein the upper wall comprises an inlet port located at the central axis, and
    a plurality of outlet openings for enabling the food liquid to leave the enclosure under the centrifugal forces exerted in the capsule during centrifugation, with the outlet openings being present on the upper wall near its periphery and located closer to the sidewall than to the central axis, with the upper wall being substantially devoid of any openings between the outlet openings and the inlet port, and the bottom wall being also devoid of any openings.

2. The capsule of claim 1, which is made of a gas-tight material and which further comprises a sealing foil covering the outlet openings for closing the capsule in a gas-tight manner.

3. The capsule of claim 1, wherein the plurality of outlet openings comprises a series of slots or holes are distributed substantially evenly around the periphery of the upper wall.

4. The capsule of claim 1, wherein the outlet openings have an average diameter or width which is smaller than the average size of the particles forming the food substance.

5. The capsule of claim 1, wherein the outlet openings have an average diameter or width between 1 and 600 microns.

6. The capsule of claim 1, further comprising a filter wall subjacent the upper wall comprising a porous material of paper filter, woven or non-woven fibers, a meshed material, a porous polymer membrane or combination thereof.

7. The capsule of claim 1, which further comprises a circumferential collecting recess, adjacent to and outwardly from the plurality of outlet openings for collecting the liquid which passes through the outlet openings, and a gas-tight sealing foil covering at least the outlet openings and collecting recess of the upper wall.

8. The capsule of claim 7, wherein the sealing foil is permanently sealed onto the sidewall or upper wall and is made of a material that is puncturable by a piercing member for water injection into the capsule.

9. The capsule of claim 7, wherein the sealing foil is removably sealed onto the sidewall or upper wall and is attached thereto by a peelable seal.

10. The capsule of claim 7, wherein the sidewall comprises a peripheral rim onto which is sealed the gas-tight sealing foil, so that the foil covers the collecting recess and the entire outer surface of the upper wall by being sealed onto the peripheral rim.

11. The capsule of claim 1, wherein the substance is ground coffee, soluble coffee, a dairy based powder, a dairy or non-dairy creamer, cocoa, a sweetener, leaf tea, herbal tea, a culinary powder, a soluble or dispersible nutritional composition, a liquid food concentrate or combinations thereof.

12. The capsule of claim 1, wherein the enclosure is formed of a food grade plastic and further comprises least one gas barrier layer.

13. The capsule of claim 12, wherein the enclosure is a thermoformed plastic laminate comprising at least one layer of polypropylene and the gas barrier layer is formal copolymer of ethylene and vinyl alcohol (EVOH).

14. A system for preparing a liquid food from a food substance contained in a capsule by passing water through the substance in the capsule using centrifugal forces comprising:
   a capsule according to claim 1; and
   a device for receiving the capsule, with the device comprising means for centrifugally driving the capsule around an axis of rotation that corresponds to the central axis of the capsule.

15. A single-use capsule for preparing a food liquid from a food substance contained in the capsule by introducing water in the capsule and passing water through the substance using centrifugal forces for producing the food liquid which is centrifuged peripherally in the capsule relatively to a central axis of the capsule corresponding to an axis of rotation during the centrifuging operation, comprising:
   an enclosure delimited by a bottom wall, a widening sidewall arranged about the central axis and a lid forming a transversal upper wall, and containing therein a predetermined amount of food substance, wherein the upper wall comprises an inlet port located at the central axis, and
   a plurality of outlet openings for enabling the food liquid to leave the enclosure under the centrifugal forces exerted in the capsule during centrifugation, with the outlet openings being present on the upper wall near its periphery and located closer to the sidewall than to the central axis, with the upper wall being substantially devoid of any openings between the outlet openings and the inlet port; and
   a circumferential collecting recess, adjacent to and outwardly from the plurality of outlet openings for collecting the liquid which passes through the outlet openings.

16. A single-use capsule-for preparing a food liquid from a food substance contained in the capsule by introducing water in the capsule and passing water through the substance using centrifugal forces for producing the food liquid which is centrifuged peripherally in the capsule relatively to a central axis of the capsule corresponding to an axis of rotation during the centrifuging operation comprising:
   an enclosure delimited by a bottom wall, a widening sidewall arranged about the central axis and a lid forming a transversal upper wall, and containing therein a predetermined amount of food substance, wherein the upper wall comprises an inlet port located at the central axis, and
   a plurality of outlet openings for enabling the food liquid to leave the enclosure under the centrifugal forces exerted in the capsule during centrifugation, with the outlet openings being present on the upper wall near its periphery and located closer to the sidewall than to the central axis, with the upper wall being substantially devoid of any openings between the outlet openings and the inlet port;
   wherein the upper wall comprises at least one peripheral recess that forms a collector for liquid food passing through the outlet openings, wherein the collecting recess extends continuously at the periphery of the upper wall.

17. A single-use capsule configured for preparing a food liquid from a food substance contained in the capsule by introducing water in the capsule and passing water through the substance using centrifugal forces for producing the food liquid which is centrifuged peripherally in the capsule relatively to a central axis of the capsule corresponding to an axis of rotation during the centrifuging operation, comprising:
   an enclosure delimited by a bottom wall, a widening sidewall arranged about the central axis and a lid forming a transversal upper wall, and containing therein a predetermined amount of food substance, wherein the upper wall comprises at least one open inlet port defining a passage for water to be introduced into the capsule, with the inlet port aligned with the central axis of the capsule, and
   a plurality of outlet openings for enabling the food liquid to leave the enclosure under the centrifugal forces exerted in the capsule during centrifugation, with the outlet openings being present on the upper wall near its periphery and located closer to the sidewall than to the central axis, with the upper wall being substantially devoid of any openings between the outlet openings and the inlet port, and the bottom wall being also devoid of any openings.

18. A single-use capsule for preparing a food liquid from a food substance contained in the capsule comprising:
   an enclosure delimited by a bottom wall, a widening sidewall arranged about a central axis and a lid forming a transversal upper wall and containing therein a predetermined amount of food substance, wherein the upper wall comprises an open inlet port defining a passage for water to be introduced into the capsule, with the inlet port aligned with the central axis of the capsule, and wherein the upper wall adjacent its periphery comprises at least one peripheral recess that forms a collector for liquid food, and
   a plurality of outlet openings distributed near and substantially evenly around the periphery of the upper wall for enabling the food liquid to leave the enclosure, with the outlet openings located closer to the sidewall than to the central axis, with the peripheral recess of the upper wall located adjacent to and outwardly from the plurality of outlet openings for collecting the liquid food which passes through the outlet openings.

19. The capsule of claim 18, further comprising a filter wall subjacent the upper wall comprising a porous material of paper filter, woven or non-woven fibers, a meshed material, a porous polymer membrane or combination thereof, and wherein the sidewall comprises a peripheral rim onto which is sealed the gas-tight sealing foil, with the foil also covering the peripheral recess and the entire upper wall by being sealed onto the peripheral rim.

20. A system for preparing a liquid food from a food substance contained in a capsule by passing water through the substance in the capsule using centrifugal forces comprising:
   a capsule according to claim 18; and
   a device for receiving the capsule, with the device comprising means for centrifugally driving the capsule around an axis of rotation that corresponds to the central axis of the capsule.

* * * * *